(12) United States Patent
Mercs et al.

(10) Patent No.: US 6,384,893 B1
(45) Date of Patent: May 7, 2002

(54) CINEMA NETWORKING SYSTEM

(75) Inventors: James Salvatore Mercs, Huntington Beach; Ara James Derderian, Alta Loma, both of CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 09/210,145

(22) Filed: Dec. 11, 1998

(51) Int. Cl.[7] .................. G03B 19/18; G03B 21/32; G03B 21/04
(52) U.S. Cl. .................. 352/133; 352/38; 352/40; 352/123
(58) Field of Search ............. 352/1, 25, 38, 352/40, 92, 123, 244, 133, 134

(56) References Cited

U.S. PATENT DOCUMENTS

| | | | | |
|---|---|---|---|---|
| 1,681,723 A | * | 8/1928 | Clas | 352/134 |
| 3,313,068 A | * | 4/1967 | Pinto | 52/8 |
| 3,379,488 A | * | 4/1968 | Lancor | 352/6 |
| 3,589,806 A | * | 6/1971 | Rak | 352/133 |
| 3,663,826 A | * | 5/1972 | Schumann et al. | 307/39 |
| 3,684,358 A | * | 8/1972 | Boudouris et al. | 352/25 |
| 4,974,252 A | * | 11/1990 | Osborne | 379/92 |
| 5,026,152 A | * | 6/1991 | Sharkey | 352/85 |
| 5,218,388 A | * | 6/1993 | Purdy | 352/92 |
| 5,801,754 A | * | 9/1998 | Ruybal et al. | 348/13 |
| 5,862,230 A | * | 1/1999 | Darby | 381/56 |
| 5,872,615 A | * | 2/1999 | Harris | 352/25 |
| 5,924,013 A | * | 7/1999 | Guido et al. | 455/3.1 |
| 5,963,247 A | * | 10/1999 | Banitt | 348/121 |
| 5,988,817 A | * | 11/1999 | Mizushima et al. | 353/94 |

OTHER PUBLICATIONS

International Search Report, PCT/US99/27666.

* cited by examiner

Primary Examiner—Russell Adams
Assistant Examiner—Rodney Fuller
(74) Attorney, Agent, or Firm—Blakely, Sokoloff, Taylor & Zafman LLP

(57) ABSTRACT

A system for automating the control of movie display electronics in a cinema. The system includes a cinema controller which receives as input information regarding start times of movies and the contents of corresponding film reels. The content of the film reel contains a plurality of elements of varying durations and formats. Using the input information, the controller determines the times of play of the different elements and sends the appropriate signals to the appropriate digital cinema processor to perform format changes, sound level changes, etc. in the projection room without operator intervention.

30 Claims, 5 Drawing Sheets

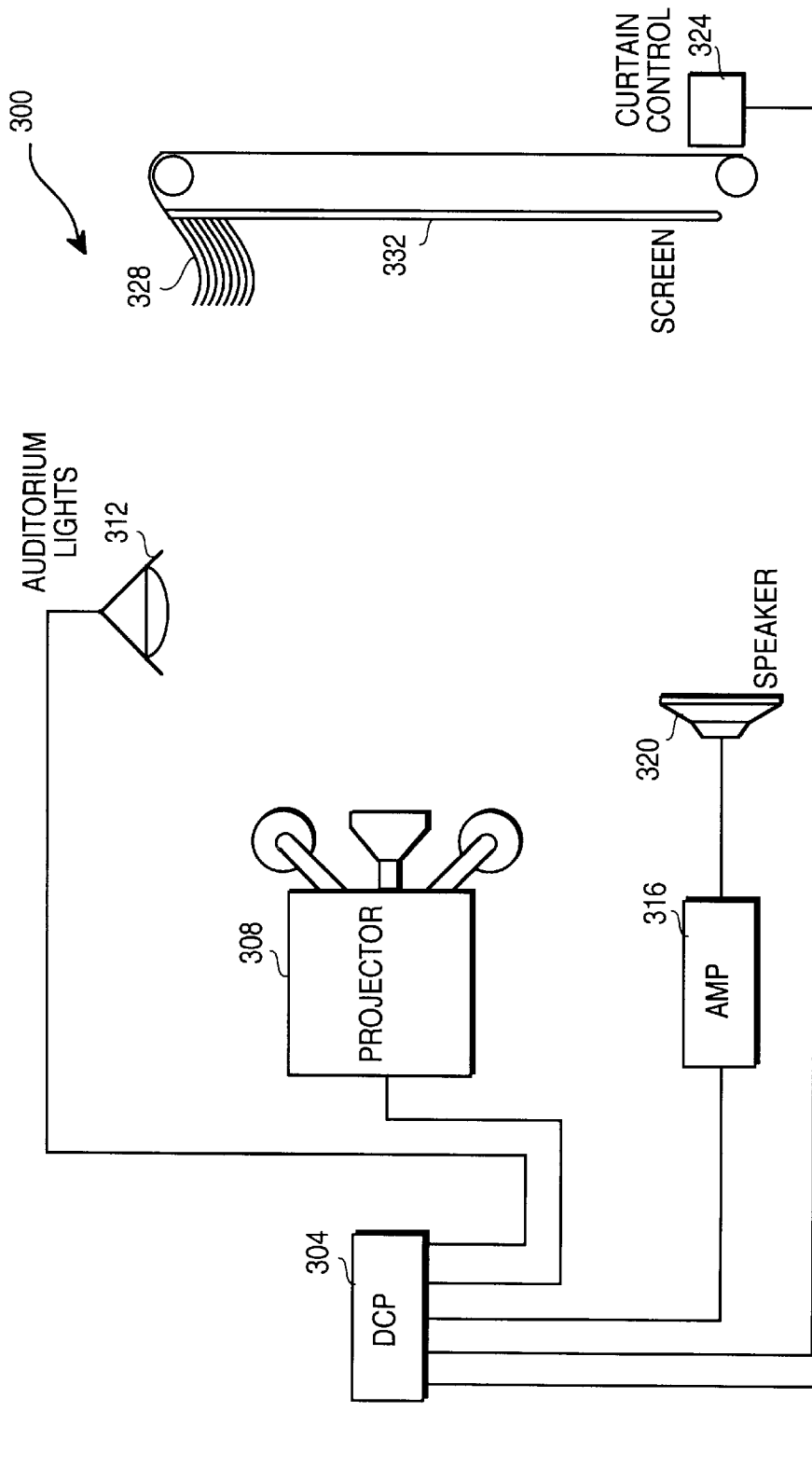
FIG. 2 PROJECTOR / SCREENING ROOM 1

| PROJECTION ROOM ID | START TIMES | | | | MOVIE TITLE | REEL SEQUENCE FORMAT | | | |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |

FIG. 4

CINEMA NETWORKING SYSTEM

BACKGROUND OF THE INVENTION

(1) Field of the Invention

The present invention relates to a control system for a multi-projection room cinema.

(2) Related Art

In recent years, multiplex cinemas have become more popular. Old cinemas typically only had two or three projection rooms, each projection room including at least one projector and a sound system for showing a movie. Typically, a projection operator moves from room to room switching projectors on and off, raising and lowering curtains, dimming lights and controlling sound systems. Most of these tasks were performed at the beginning and end of a movie allowing the projection operator to start and end movies in a first room while a movie was playing in a second room. Modern modem multiplex cinemas have many rooms making it difficult for one projection operator to synchronize movies such that all movies playing in a cinema start and end at different times. Furthermore, it is not uncommon to deliberately schedule movies to start at the same time. Thus several projection operators are required in multiplex cinemas, substantially increasing labor costs.

Furthermore, it is not unusual to have movies in different film formats. Although modern projection devices can typically play different film formats, the actual format needs to be manually selected by an operator. In addition, frequently a film reel will contain a number of segments. For purposes of discussion herein, segments can include the movie, movie trailers and advertising. The number of segments can vary from reel to reel. Each segment can be in a different film format, therefore requiring an adjustment to the projection system each time a format change occurs. Each segment can be of different length, making it difficult to manually predict when to readjust the projection system. Typically, cinema operators watch for mechanical queues, such as a small flash of light which appears on the upper corner of the screen, and manually change the settings on the projection system when the operator sees the mechanical queue. In large multiplex cinemas, this process requires a large number of operators to monitor and operate the projection equipment as many movies are ongoing at the same time and each may have a different number of segments and sequence of play of segments.

In addition, in a multiplex cinema equipment failures can easily go undetected. Typically, the failures are noticed only by periodic checks by cinema operators or by complaining patrons. Thus, a significant amount of time can pass before the projection operator is aware of the equipment failure.

SUMMARY

The system and method of the present invention enables the remote monitoring and control of one or more projection rooms in a cinema. In one embodiment, a cinema controller is coupled to a number of cinema processors to manage the electronics in each projection room of a cinema. Information regarding the movies, start times and film reel content is input to the cinema controller. Using this information, the cinema controller issues the proper control signals to a specific cinema processor in order to play a particular film reel component in its specified format. Using this system, the need for cinema operators to closely monitor and perform manual format adjustments is avoided.

BRIEF DESCRIPTION OF THE DRAWINGS

FIG. 2 illustrates an exemplary cinema projection room.

FIG. 4 is a table illustrating an exemplary input in accordance with the teachings of the present invention.

DETAILED DESCRIPTION

In the following discussion, a control system for controlling electronic equipment in a cinema will be described. In one embodiment a network in a multiplex cinema includes a central cinema controller that communicates with one or more digital control processors (DCPs). Each DCP monitors and controls the electronics in one or more projection rooms of the cinema, minimizing the number of operators needed to run the cinema.

In another embodiment, the system of the present invention coordinates one or more cinemas with a central site such as a headquarters office. Thus, a server computer at the central site communicates with a network of one or more cinema controllers, each cinema controller coordinating one or more DCPs, each DCP monitoring and controlling electronics in at least one projection room of the cinema.

In the described embodiment, a number of details will be included to facilitate understanding of the invention. For example, although embodiments described herein utilized DCPs, the present invention is not limited to DCPs and can include a variety of types of cinema processors that include digital circuitry to process digital formatted film, digital circuitry to process analog formatted film and analog circuitry to process analog formatted film. In addition, the cinema processors may include the logic and circuits needed to communicate with the controller and selectively perform other functions described below. Cinema processors may also be configured to control projection room equipment which may include projection apparatus as described herein as well as other types of video equipment, audio equipment, for example, sound systems, lighting, climate control and curtains. Furthermore, multiple cinema processors may be employed to control various equipment used to operate functions of a projection room.

Furthermore, the connection between the cinema controller and each DCP will be described as a RS-232 serial connection and the communication medium between the cinema controller and the server computer will be described as a telephone line. However, it is recognized that modifications of such details could be implemented by one of ordinary skill in the art and still fall within the scope of the invention. The details provided in this description are intended to facilitate understanding of the invention and describe a preferred embodiment of the invention and should not be used to limit the scope of the invention. The scope of the invention should only be defined in terms of the claims at the end of this patent.

Figure 1A:
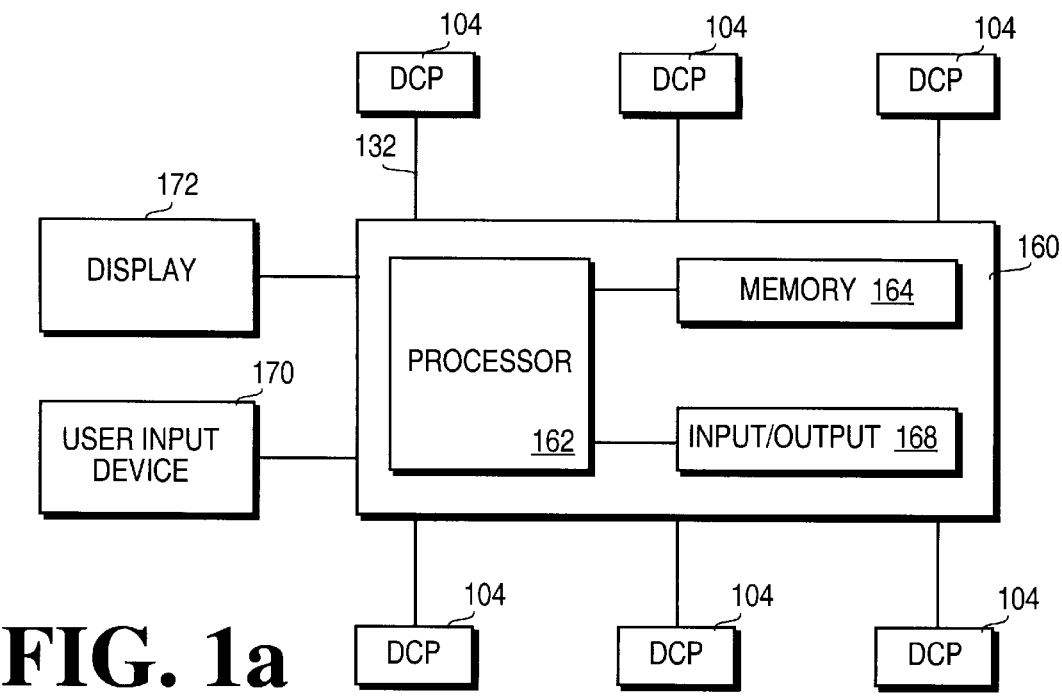
FIG. 1a is a block diagram illustrating one embodiment of a network of digital cinema processors (DCP) and a cinema controller in accordance with the teachings of the present invention and FIG. 1b is a functional block diagram illustrating one embodiment of a network of DCPs and a cinema controller.

FIG. 1a illustrates a schematic block diagram of one embodiment of a cinema controller 160 coupled to a plurality of digital cinema processors (DCPs) 104. In one embodiment, the DCP is a Sony Digital Cinema Processor 1000, manufactured by Sony Corporation of Japan.

The cinema controller 160 includes a processor 162, memory 164, input/output circuitry 168, a user control device such as a mouse or a keyboard and a display 172. In one embodiment the controller 160 is a personal computer such as an Intel® processor-based machine (Intel is a trademark of Intel Corporation). In this embodiment, instructions are stored on a medium, such as memory 164 and executed by the processor 162 to perform the tasks described herein. Input to the controller 160 can be achieved a variety of ways including via a keyboard or on-screen input menu. Furthermore, it is contemplated that the input may be received over a communications link, such as a telephone or data line, from an external site, including a main office computer system.

Control data and status information may be communicated between a DCP 104 and the controller 160. For example, the DCP 104 may periodically transfer data, or transfer on the occurrence of predetermined events. Alternately, the cinema controller 160 requests data. Preferably, the cinema controller 160 requests status information in a background mode allowing the DCP 104 to perform other tasks during the information transfer process. Background transmission of data results in minimal system degradation.

Communication between the DCP and the cinema controller 160 may be implemented a variety of ways. In one embodiment, communication is implemented using a serial port transmitting and receiving signals over a local communications link such as communications link 132 coupling DCP 104 to the cinema controller 160. In one embodiment, the local communications link 132 is an RS-232 serial cable and is connected to the COMM port 2 of the Sony DCP 1000. It is readily apparent that a variety of communication media and protocols can be used including wireless and optical communication media. In one embodiment, the communication between cinema controller 160 and the DCP 104 occurs at an asynchronous transfer rate of about 9,600 baud. Each byte of information transmitted or received across the local communications link 132 has a start bit prefacing the byte. A stop bit is also appended to each byte. No parity bit is used. The DCP 104 monitors the serial port for automation data allowing the cinema controller 160 to initiate communication by merely transmitting messages.

Flow control may be accomplished a variety of ways including by using acknowledgment (ACK) and negative acknowledgment (NACK) messages. Each DCP can be programmed to have a unique identification (ID). To assure proper communications, the cinema controller 160 may transmit a detection message and wait for the DCP 104 to respond with an ACK message before new commands or detection messages are sent. An ACK message from the DCP 104 may indicate that either the last command was completed successfully or that the last message was received and processed successfully. When a negative acknowledgment (NACK) message is received, the cinema controller 160 may respond by retransmitting the command or detection message. A NACK message transmitted by the, DCP 104 indicates that the corresponding command or message received from the cinema controller 160 is not valid. The cinema controller 160 may respond by retransmitting the last command. Alternatively, the cinema controller 160 may transmit an alternate command. Besides indicating that a command was not valid or not properly received, a NACK code may also include further information. For example, NACK codes may be encoded to indicate a check sum error, an undefined control byte error, an undefined request, a volume or gain out of range problem, or an incomplete message.

In one embodiment of the invention, software running within the cinema controller 160 controls the transmission of the requests and the handling of ACK and NACK responses received from the DCP 104. A clock in the cinema controller 160 coordinates the transmission of requests and the receipt of appropriate response signals including the NACK and ACK signals. Preferably, DCP clocks in each DCP 104 are preferably synchronized to a cinema controller clock (not shown) allowing each DCP 104 to implement command functions from the controller 160 including when to start projectors, dim auditorium lights and open and close curtains.

The DCP 104 may also be configured to accumulate and determine statistics including data on the number of hours of operation since the last inquiry from the cinema controller 160, a record of start and stop times, a record of problems or equipment failures, and the DCP hardware configuration used. This information can then be transmitted to the controller 160 for operation and maintenance tracking and reporting. In one embodiment, the controller 160 stores data from the DCP 104 in a file. This data may subsequently be received by an operator, for example, through a spreadsheet program.

When a problem is detected, the DCP 104 communicates the problem to the main cinema controller 160 using an interrupt. Thus emergency problems may be addressed immediately. In addition, it is preferred that when such an interrupt occurs, a display message may be transmitted to a monitoring or display device on the main cinema controller 160 indicating that a particular projection room corresponding to the DCP 104 needs immediate servicing or attention. The cinema controller 160 may also be programmed to handle problems or suggest appropriate corrective steps.

The cinema controller 160 uses the cinema controller clock to maintain time records of events that occur in each room. For example, if records indicate that equipment in a projection room is failing more often than equipment in other projection rooms, a more thorough service or maintenance may be performed. In one embodiment, the cinema controller 160 may also record information such as ticket sales corresponding to each movie performance in each room of the cinema.

Figure 1B:
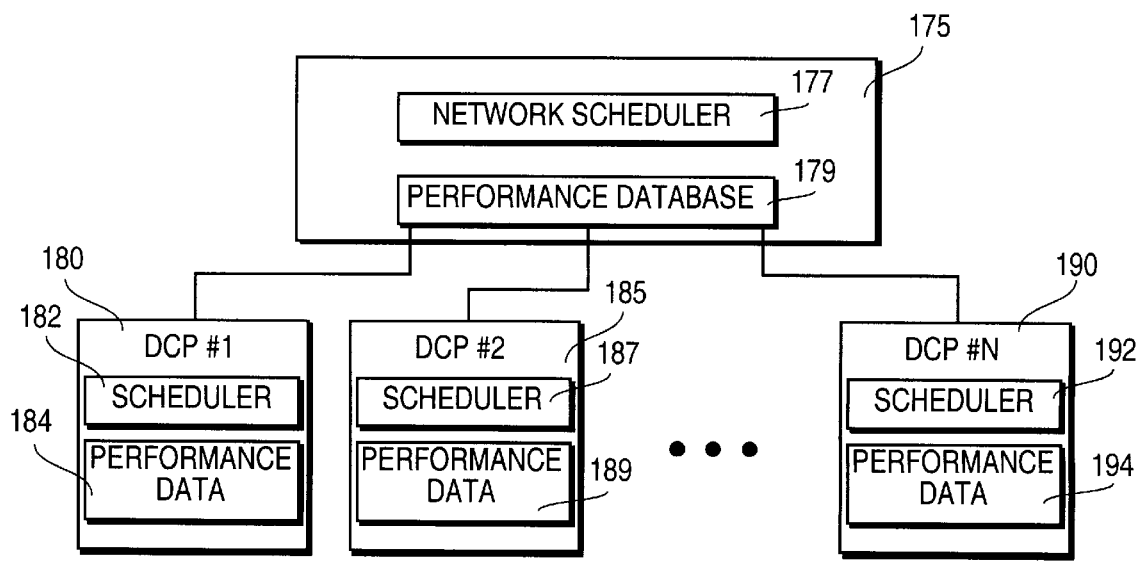

FIG. 1b is a functional block diagram of one embodiment of a system that operates in accordance with the teachings of the present invention. The controller 175 is connected to one or more DCPs 180, 185, 190. The controller includes a network scheduler process 177 and a performance database 179. The network scheduler process 177 includes logic to receive input regarding scheduling including movie schedules, film formats and other cinema operations which may be stored at the controller 175. The controller 175 uses the input to issues appropriate commands at the appropriate times to control the operation of the DCPs 180, 185, 190. DCPs 180, 185, 190 include scheduling logic 182, 187, 192 that receives the scheduling commands from controller 175 and performs the operations indicated by the command, including starting play of a film, setting format changes and modifying sound levels.

The controller 175 also includes a performance database 179 that stores information regarding the performance of the cinema. For example, the database may include data such as actual start times, films played as well as maintenance records. Other information may also be included. In one embodiment, the controller 175 is part of or coupled to a ticket system that is used in the operation of ticket sales. In this embodiment, the performance database 179 includes sales information. Alternately, sales information may be input by an operator into the performance database 179 of the controller 175.

Typically, the performance data relevant to each DCP 180, 185, 190 is generated by performance data logic 184, 189, 194. Transmission of performance data may be trigger by a clock or upon occurrence of predetermined events. Such transmissions may be performed in the background of the controller 175 and DCPs 180, 185, 190.

FIG. 2 illustrates a DCP 204 operating in a projection room 200 of a cinema. The DCP 204 controls the operation of the coupled projector 208. For example, the DCP 204 controls the start and completion of the projection of the contents of a film reel by projector 208. Furthermore, the DCP 204 may also adjust operating modes of projector 208 to account for different movie formats. Such movie formats may include adjusting aspect ratios and soundtrack information. Examples of formats include those compatible with Dolby SR, Dolby A Noise Reduction and WR1, WR2 Digital Analog Passthrough.

In other embodiments of the invention, additional control signals generated by the DCP 204 in response to control signals issued by the controller, control the auditorium lights 212, turning on the lights after the movie, and dimming them or switching them off during the movie. The DCP 204 may be programmed to partially dim the auditorium lights 212 during the movie previews allowing late audience customers to come into a cinema room 204 with some lighting. In one embodiment of the invention, DCP 204 may also be coupled to a sound system including an amplifier 216 which amplifies the movie soundtrack output to a speaker 220. The DCP 204 may adjust amplifier 216 gain to accommodate particular acoustics of the room 200 and the type of movie being shown. In one embodiment, the DCP 204 controls a curtain control 224 which raises and lowers a curtain 228 over a screen 232. The DCP 204 may transmit signals causing the curtain control 224 to automatically raise the curtain 228 before the movie and automatically lower the curtain 228 at the end of the movie.

Alternately, at least one separate device coupled to the controller may be used to control the projection room environment, including sound, lighting, temperature in the room, etc. Such a device would receive appropriate signals from the controller and perform the appropriate tasks.

Figure 3:
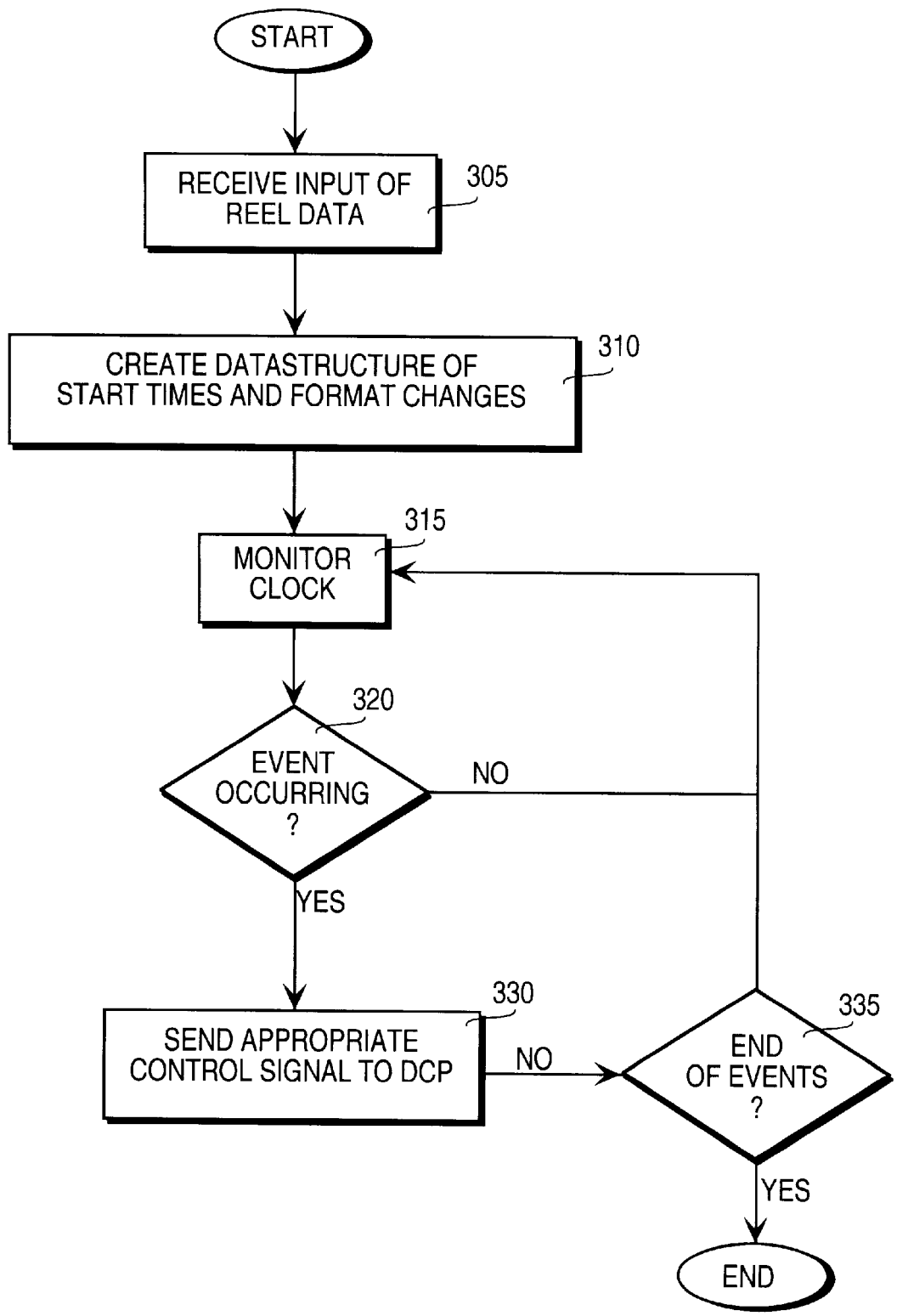
FIG. 3 is a flow chart illustrating one embodiment of the process performed by the cinema controller in accordance with the teachings of the present invention.

One embodiment of a process for controlling one or more projection rooms is illustrated by the flow chart of FIG. 3. At step 305, the input information is received. In the present embodiment, this information includes an identification of the projection room, and therefore, in the present embodiment, the DCP, (in a multiplex environment composed of multiple projection rooms), the title of the movie to be played in each projection room, the start time(s) of the movie(s) to be played in each projection room, and the sequence, format and duration of the segments on the film reel to be played. Other information may also be input, such as how to adjust the sound system, when to dim the lights, raise/lower the curtain, etc.

The information can be input a variety of ways. In one embodiment, the information is manually entered into a file or database for subsequent reference. An example of an entry form that may be displayed is illustrated in FIG. 4. In this embodiment, an operator enters, either via a keyboard and/or by using a cursor control device, a description of the content of the film reels including the duration and film format of each segment. In addition, a film identifier, such as the title, is supplied along with the times it is to be played in a particular projection room. Other embodiments are also contemplated. For example, the information may be received or downloaded from a remote centralized location. Alternately, the information may be retrievable from a web site maintained to contain such information.

Referring back to FIG. 3, at step 310 a data structure is generated using the input received. This data structure may be embodied a variety of ways including in a database, spreadsheet, a text file or even a data stream of coded information representative of the input. Preferably, the data structure includes times of each event, e.g., format changes calculated from the scheduled start time of the film reel and the sequence and duration of the film reel elements.

The system references the data structure to determine when to send particular control signals to the appropriate DCPs to perform automatic format changes without operator intervention. In an alternate embodiment, the system references the data structure to perform other control functions including the lights, curtains and level of sound in the particular projection room.

At step 315, the controller monitors a clock and if at step 320, an event is to occur, then the controller generates the appropriate command to send to the DCP, step 330. The clock can be an external clock or one internally generated. In one embodiment, all the DCPs in a cinema are controlled by the same controller; therefore, the start times, etc., are synchronized. In an alternate embodiment configured by multiple controllers, the controllers are synchronized by an external clock or a clock of one of the controllers. The commands to be sent may be coded into the software or alternately stored in a data structure for easy retrieval and update as necessary to accommodate subsequent upgrades to the DCPs or the controller.

If no further events are to be performed, step 335, the process is complete; otherwise, the controller continues to monitor the clock, and perform steps 315, 320, 330 as necessary.

Using this process, the need to have an operator constantly monitor a projection room is avoided as all format changes on a reel and other projection room operations are automatically controlled.

In an alternate embodiment, the controller monitors the DCPs to determine when maintenance or operator intervention is required. Thus, if something goes wrong in the projection room, the controller will alert an operator to address the problem. In this embodiment, the controller polls the DCPs or monitors interrupt signals received from the DCPs which may be indicative of problems. Some maintenance may be automatic. For example, if an error occurs during play of digital tracks of a film, a switch may be made to use the analog tracks.

Sensors around the cinema room may provide additional information on whether all of the electronics in a projection room are working properly. Sensors used may include microphones to detect whether the sound system is outputting the proper volume of sound and photo-detectors to monitor the ambient light conditions. After receiving the status query, the DCP acknowledges the status query and transmits the operational status of the projection room. This information may be used to generate maintenance records which may be used to determine when maintenance or equipment replacement is needed.

The controller can also be configured to maintain operation records of the different projection rooms. For example the controller may maintain records of how many times a particular movie was played. Furthermore, it is contemplated that the operation records may include information input regarding attendance and revenue.

In an alternate embodiment, a plurality of cinema controllers located at the same cinema complex or different complexes communicate with a central office. This is illustrated in FIG. 5.

Figure 5:
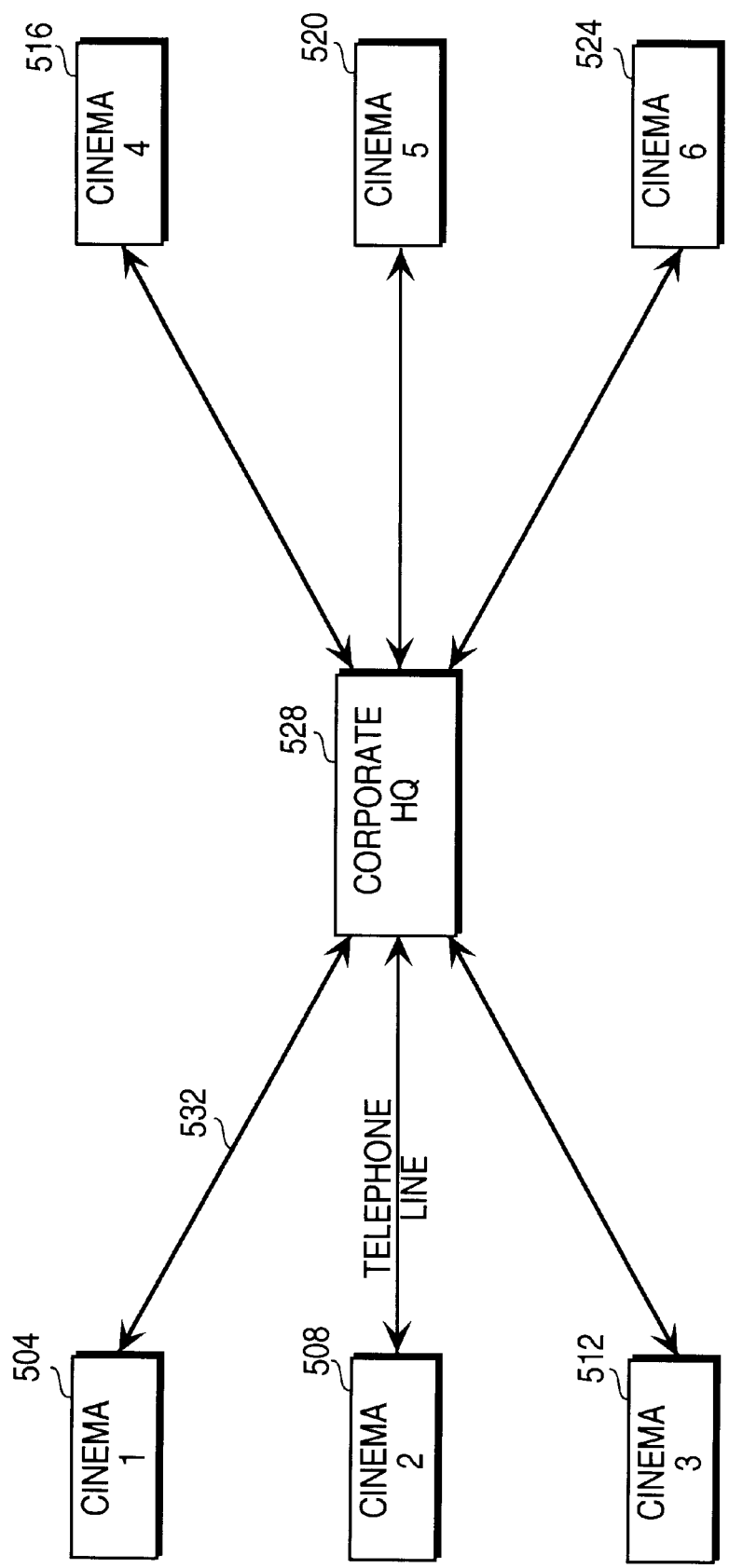
FIG. 5 is a block diagram illustrating one embodiment of a corporate network of cinema controllers in accordance with the teachings of the present invention.

FIG. 5 is a block diagram showing one embodiment of a layout of network of cinema controllers 504, 508, 512, 516, 520, 524 coupled to a server computer 528. Each cinema controller 504, 508, 512, 516, 520, 524 is coupled to the server computer 528 via a communications link 532. The communications link may be a telephone line, an ISDN connection or a variety of cable or wireless transfer mechanisms. It is contemplated that a variety of network configurations may be used. For example, local groups of cinema controllers may be clustered together or connected to a local server (which may be one of the cinema controllers) which is also connected to the server computer 528. Furthermore, it is contemplated that server computer 528 may be one or more networked computers performing the functionality described herein.

Each cinema controller 504 508, 512, 516, 520, 524 communicates data collected at a cinema over a corresponding communication link such as communications link 532. A variety with data related to the business and conditions may be collected. The data may include status information such as the intended and actual start times and end times of movies playing, the titles of movies that are playing, ticket sales for each schedule of each movie, equipment failures at the cinema, and types of equipment used at the cinema. In one embodiment, each cinema controller 504, 508, 512, 516, 520, 524 aggregates the data recovered from the DCPs and automatically transmits the data to the network server computer 528. Alternately, the server computer calls each cinema controller 504, 508, 512, 516, 520, 524 and requests data. Such data requests preferably occurs after hours when telephone rates and telephone traffic is minimized. In such a polling model, the server computer 528 may request specific status information as needed.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A cinema system comprising:
   a plurality of projection apparatuses configured to display the contents of film reels on a plurality of screens;
   a plurality of cinema processors, each cinema processor coupled to one projection apparatus of the plurality of projection apparatuses, each cinema processor configured to control the operation of the one coupled projection apparatus; and
   a cinema controller coupled to each cinema processor of the plurality of cinema processors and configured to control each cinema processor, said cinema controller comprising a data structure comprising start times of film reels, contents of film reels containing a plurality of film reel elements, and a sequence, format and duration of each film element, said cinema controller further configured to control each cinema processor in accordance with a clock and the data structure such that manual intervention to start film reels and change projection format on the one coupled projection apparatus is eliminated.

2. The cinema system as set forth in claim 1, wherein film reel elements are selected from the group consisting of movies, movie trailers and advertisements.

3. The cinema system as set forth in claim 1, said cinema controller further comprising an input device configured to receive at least some of the contents of the data structure and store the contents in the data structure.

4. The cinema system as set forth in claim 3, wherein the input device is a keyboard.

5. The cinema system as set forth in claim 3, wherein the input device is a data port configured to receive a data stream.

6. The cinema system as set forth in claim 3, wherein the input device is a data port configured to access a central location containing the contents of the data structure.

7. The cinema system as set forth in claim 1, said cinema processor is further configured to communicate device status information to the cinema controller, said cinema controller further configured to monitor device status information and provide alerts when a projection apparatus of said plurality of projection apparatuses or cinema processor of said plurality of cinema processors requires maintenance.

8. The cinema system as set forth in claim 1, further comprising a central office server, said server configured to receive operational information from the cinema controller.

9. A method for controlling the operation of a cinema comprising:
   providing a cinema controller coupled to a plurality of projection rooms, each projection room consisting of a projection apparatus;
   monitoring a clock;
   accessing a data structure comprising start times of film reels, contents of film reels containing a plurality of film reel elements, and a sequence, format and duration of each film reel element;
   determining when an event occurs which requires an action in one projection room, said event determined based upon the clock and the data structure; and
   issuing a control signal to the one projection room to perform the action in accordance with the clock and the data structure such that manual intervention to start film reels and change projection format on the projection apparatus is eliminated.

10. The method as set forth in claim 9, wherein the step of determining comprises the steps of:
    referencing the start time of a film reel; and
    determining a time for each format change based on the start time, sequence of elements and duration of each element.

11. The method as set forth in claim 9, further comprising the step of receiving contents of the data structure through an input device.

12. The method as set forth in claim 11, wherein the step of receiving comprises the steps of accessing a central location and retrieving at least some of the contents of the data structure.

13. The method as set forth in claim 11, wherein the step of receiving comprises the step of an operator entering at least some of the contents of the data structure using the input device.

14. The method as set forth in claim 9, further comprising the steps of: receiving maintenance information from the one projection room; and alerting an operator that maintenance is needed.

15. The method as set forth in claim 9, further comprising the steps of:
    maintaining operation information; and
    communicating operation information to a central office server.

16. A computer readable medium containing instructions, which when executed in a processing system, cause the system to perform a method for controlling the operation of a cinema, the cinema comprising a plurality of projection rooms, each projection room including projection room equipment, the method comprising:
    monitoring a clock;
    accessing a data structure comprising start times of film reels, contents of film reels containing a plurality of film reel elements, and a sequence, format and duration of each film reel element;
    determining when an event occurs which requires an action in one projection room, said event determined based upon the clock and the data structure; and
    issuing a control signal to the one projection room to perform the action in accordance with the clock and the data structure such that manual intervention to start film reels and change projection format on the projection room equipment is eliminated.

17. The computer readable medium as set forth in claim 16, wherein instructions, which when executed determine when an event occurs, comprise:
    referencing the start time of a film reel; and
    determining a time for each format change based on the start time,
    sequence of elements and duration of each element.

18. The computer readable medium as set forth in claim 16, further comprising instructions, which when executed, perform a step of receiving contents of the data structure through an input device.

19. The computer readable medium as set forth in claim 18, wherein instructions, when executed, receive contents of the data structure, access a central location and retrieve at least some of the contents of the data structure using the input device.

20. The computer readable medium as set forth in claim 18, wherein instructions, when executed, receive contents of the data structure, include an operator entering at least some of the contents of the data structure using the input device.

21. The computer readable medium as set forth in claim 16, further comprising instructions, which when executed in a processing system, perform maintenance alerts comprising the steps of:
    receiving maintenance information from the one projection room; and alerting an operator that maintenance is needed.

22. A cinema system comprising:
    a plurality of cinema processors, each cinema-processor coupled to projection room equipment, each cinema processor configured to control the coupled projection room equipment; and
    a cinema controller coupled to each cinema processor of the plurality of cinema processors and configured to control each cinema processor, said cinema controller comprising a data structure comprising start times of cinema operations relative to the projection room equipment, said cinema controller further configured to control each cinema processor in accordance with a clock and the data structure such that manual intervention to control the coupled projection room equipment is eliminated.

23. The cinema system as set forth in claim 22, wherein the projection room equipment is selected from a group comprising projection apparatus, video equipment, audio equipment, climate control, lighting and curtains.

24. The cinema system as set forth in claim 22, said cinema controller further comprising an input device configured to receive at least some of the contents of the data structure and store the contents of the data structure.

25. The cinema system as set forth in claim 22, said each cinema processor configured to communicate equipment status information to the cinema controller, said cinema controller further configured to monitor equipment status information and provide alerts when equipment requires maintenance.

26. The cinema system as set forth in claim 22, further comprising a central office server, said server configured to receive operational information from the cinema controller.

27. A method for controlling the operation of a cinema comprising:
    providing a cinema controller coupled to a plurality of projection rooms, each projection room comprising projection room equipment;
    monitoring a clock;
    accessing a data structure comprising start times of cinema operations relative to the projection room equipment, contents of film reels containing a plurality of film reel elements, and a sequence, format and duration of each film reel element;
    determining when an event occurs which requires an action in one projection room, said event determined based upon the clock and the data structure; and
    issuing a control signal to the one projection room to perform the action in accordance with the clock and the data structure such that manual intervention to start film reels and change projection format on the projection room equipment is eliminated.

28. The method as set forth in claim 27, further comprising:
    receiving information from the one projection room; and
    alerting an operator that maintenance is needed.

29. A computer readable medium containing instructions, which when executed in a processing system, cause the system to perform a method for controlling the operation of a cinema, the cinema comprising a plurality of projection rooms, each projection room including projection room equipment, the method comprising:
    monitoring a clock;
    accessing a data structure comprising start times of cinema operations relative to projection room equipment, contents of film reels containing a plurality of film reel elements, and a sequence, format and duration of each film reel element; and
    determining when an event occurs which requires an action in one projection room, said event determined based upon the clock and the data structure;
    issuing a control signal to the one projection room to perform the action in accordance with the clock and the data structure such that manual intervention to start film reels and change projection format on the projection room equipment is eliminated.

30. The computer readable medium as set forth in claim 29, further comprising instructions, which when executed, provide information regarding maintenance, comprising:
    receiving information from the one projection room; and
    alerting an operator that maintenance is needed.

* * * * *